Patented June 23, 1936

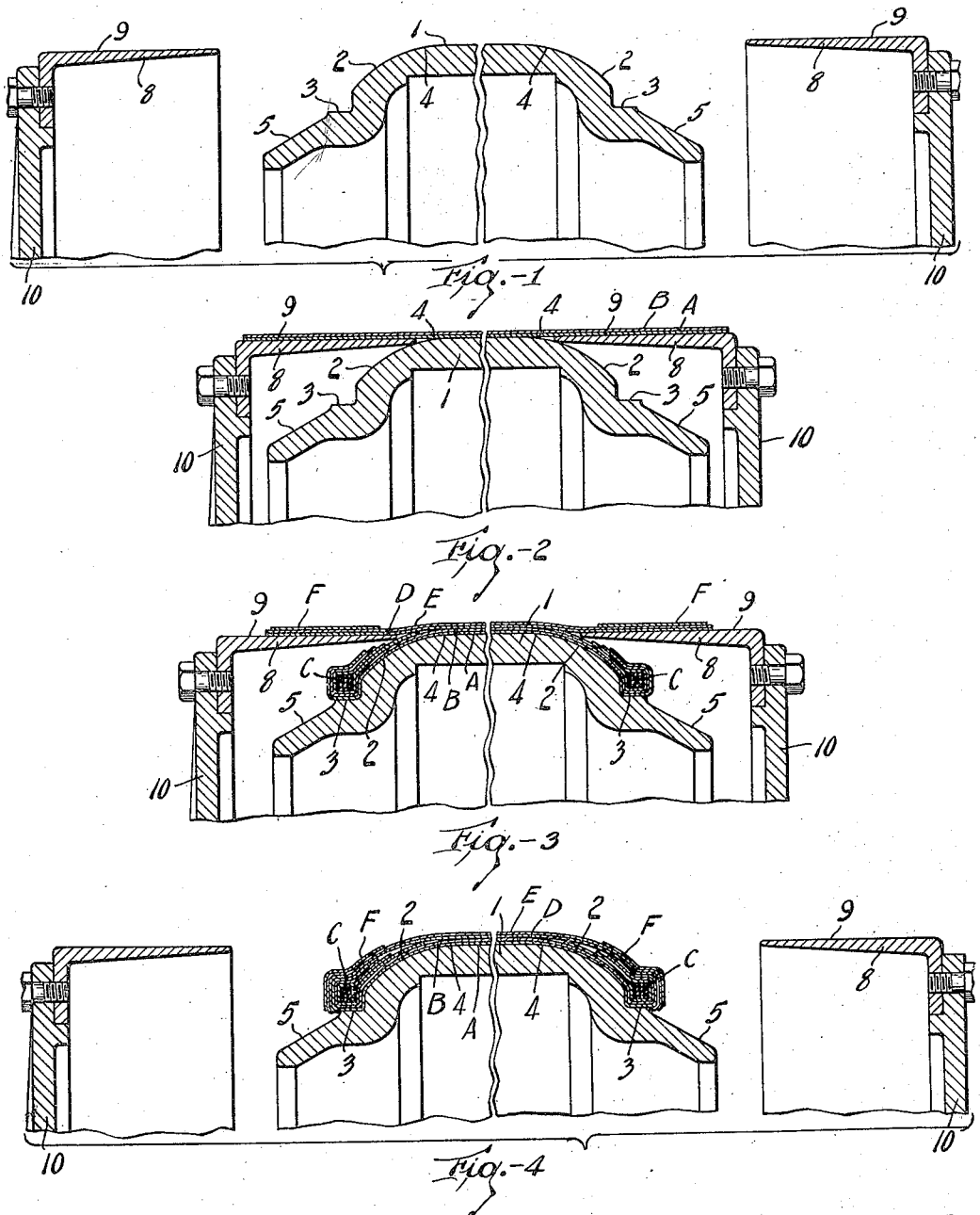

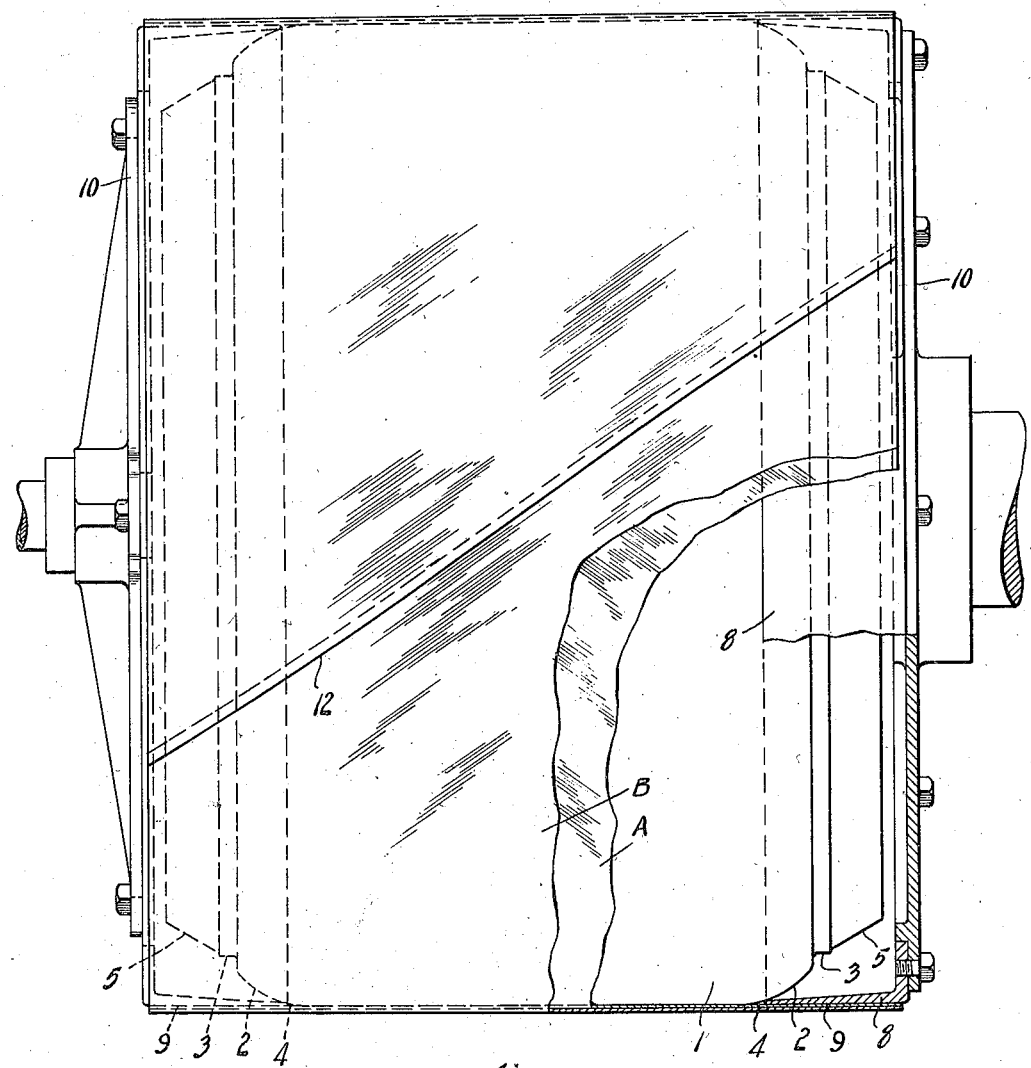

2,045,545

UNITED STATES PATENT OFFICE 2,045,545

PROCESS AND APPARATUS FOR MAKING DRUM BUILT TIRES

Florain J. Shook, Akron, Ohio, assignor to National-Standard Company, Niles, Mich., a corporation of Michigan Application October 30, 1933, Serial No. 695,774

7 Claims. (Cl. 154—14)

The present invention relates to the manufacture of pneumatic tires by the so-called "drum building" process. In the making of these tires, it is customary to provide a drum or form which is flat or has a slight curvature over the central or major portion of the drum. In the modern methods of making these tires where beads of wire tape or strands of wire are employed, it has been found necessary to provide the drum with bead seats which are located inwardly of the main carcass building surface and connected therewith by more or less extensive shoulders. The fabric forming the carcass is applied in plies, some of which are placed on the drum before the beads are applied, and shaped over the shoulders and bead seats. The beads are then applied and the over-bead plies are then applied. The edges of the fabric are brought around the beads so that the latter are securely positioned in the carcass.

In the manufacture of tires upon usual shoulder drums, the plies of rubberized, bias-cut, cord fabric are led from sources of supply and wrapped about the drum, generally without tension. The operative is required to splice the ends of the plies together and also to adhere each succeeding ply to the next inner ply before stitching or spinning the fabric down over the shoulders and into the bead seats or over the bead.

In the splicing operation as formerly employed, the edges of the plies which lie beyond the lines where the shoulder begins must be spliced by hand against the surfaces of the shoulder and on the bead seats. Due to the fact that these edge portions of the drums are irregular surfaces, the splicing operation consumes considerable time, and unless done carefully, wrinkles and unevenness will occur. This difficulty is practically limited to the edge portions of the drums as there is no difficulty experienced in splicing the fabric over the central portion.

My invention proposes the elimination of the difficulty of splicing the fabric over the shoulders and bead seats by establishing a condition at these points comparable to the main or central portion of the band. I propose to accomplish this purpose by providing temporary extensions or continuations of the main or flat portion of the drum which extend outwardly sufficiently to provide flat, that is to say cylindrical, surfaces so that the plies may be spliced and assembled in substantially cylindrical form, the shaping of the edge portions about the shoulders and bead seats taking place after the splicing operation is completed. This eliminates the objections heretofore discussed, a substantially flat surface being provided across the entire width of the tire for the splicing operation.

In the drawings which accompany this application and in the detailed description is shown one form of the invention, it being specifically understood that this showing is illustrative merely and that changes, modifications and variations may be made so long as the essence of the invention is secured. The drum illustrated is flat as shown, but it may be curved or crowned in accordance with established or preferred practices. The bead seats may be deeper or shallower than shown and the extensions need not necessarily be absolutely cylindrical, it being sufficient only to provide a substantially continuous or unbroken extension to the tire building surface of the drum. Other changes will suggest themselves to those skilled in this art, the purpose of the specification and description being to enable the invention to be practised.

The invention relates not only to the apparatus, but also to the process of making tires which is disclosed.

In the drawings:

Figure 1 is a cross-section through a standard building drum with the extensions removed, this view being taken before any building operations take place. The drum is broken out at the center and the flanges or extensions should be further removed to permit the operative free access to the drum. The invention is shown in this manner for the sake of compactness of the drawings.

Figure 2 is a view showing the flanges in place and the first or under bead layers applied, the drawing showing a four-ply tire with two plies under and two over the bead. The number of plies may be varied and their location as to the bead altered without affecting the invention.

Figure 3 is a view showing the under-bead plies in place with the beads in position and the plies wrapped about the beads. The extensions are shown in position to receive the over-bead plies which are also shown. It will be understood that between the operations of Figures 2 and 3, the flanges were removed and the under-bead plies stitched over the shoulders and the beads applied.

Figure 4 is a view showing the carcass completed and the flanges removed. After this operation, the breaker, tread, sidewalls and other elements of the tire are added and the carcass is ready for the shaping and vulcanizing.

Figure 5 is a plan view of the drum at the stage illustrated in Figure 2, part of the plies and flange being broken away.

The drum consists of a central or main tire building portion 1 which extends from shoulder to shoulder and, as shown herein, is flat or substantially flat across the tire building surface. The drum may be crowned as specified. It may be adjustable laterally if desired and is collapsible by any desired means or mechanism so that the finished carcass may be removed.

At the edges of the surfaces 1 are the curved shoulders 2 which connect the surface 1 with the bead seats 3, from which point outwardly the drums are usually provided with aprons or extensions 5. It will be appreciated that the contour and extent of the shouldered portions of the drum, which include the surfaces 2, 3, and 5, may be varied in accordance with the dictates and preferences of various tire manufacturers.

It is from the point 4 where the shoulder begins to break that the aforementioned difficulties in laying and splicing the fabric occur. This fabric is coated with sticky rubber which makes it difficult to properly splice and lay the fabric from this point outwardly.

At the sides of the drum I provide two extensions or flanges 8 which are usually tapered at their inner surfaces and which are movable into position so that the upper surfaces 9 lie tangent or substantially tangent to the main surface 1. As shown, these surfaces are cylindrical, but they are not necessarily so. They form extensions to the tire building surface of sufficient extent to support the edges of the plies. As shown, they reach in their innermost positions substantially to the lines 4 and as that line shifts the flanges may be made of greater or less width. I have shown the rings 8 as attached to supports or carriers 10 which may be moved by any desired mechanical devices to and from the operative positions. This is not essential as the rings may be operated and set in position by hand, any desirable centering device being employed to insure the alignment of the surfaces 9 substantially with the surface 1 of the drum. As explained, the outer portions shown in Figures 1 and 4 are not exact and these views may be considered as showing the rings or flanges as only partly removed.

It will be seen that when placed in operative position as shown in Figures 2, 3, and 5, the flanges or rings cover the shouldered portions of the drum and make a substantially flat surface against which the under-bead plies A and B can be laid and spliced by hand, a line of such splice being shown at 12 in Figure 5. After the laying and splicing operation shown in Figures 2 and 5 is completed, the extensions or rings are withdrawn and the free skirts of the fabric are ready to be spun or shaped over the shoulder and into the bead seat without wrinkling, which frequently occurs where the splicing has to be done by hand over the irregular surfaces of the drum shoulders.

The beads C are then applied at the edges of the plies and the plies folded over. The rings are then moved up into the position shown in Figure 3, the flanges clearing the beads, and the over-bead layers D and E applied and spliced in the same manner. I have shown the chafer strip F applied to the edges of the outermost ply, and this strip may be employed, the fact that a flat surface is provided for the application of this strip speeding up the building operation.

The flanges are now withdrawn and the outer plies, including the chafer if desired, are shaped over the bead.

The tire carcass is now completed and the additional layers of fabric and rubber may be applied to complete the uncured tire.

It will be seen that not only is a new and very useful apparatus provided for tire building, but the process of laying and splicing the fabric while the edges are in the plane of the drum and before the shaping operation is new and very useful.

Wherever the surfaces of the drum extensions are referred to as "flat", it will be understood that the term covers substantial flatness as well, and the plane of the drum is to be considered as the substantial plane across the drum. The process is intended to cover both the under and over bead ply application.

What is claimed is:

1. A process for making drum built tires in which the edge portions of the drum are of reduced diameter, consisting in applying the fabric over the surface of the drum from edge to edge in substantially flat condition, splicing the ends of the fabric over the whole surface thereof while supporting the lateral marginal portions of the fabric at the same diameter as the medial portion thereof, and subsequently forming the fabric over the reduced shoulders of the drum.

2. A process of making drum built tires in which the drums are provided with bead seats substantially below the central portion of the drum and connected thereto by shoulders, comprising providing lateral extensions to the central portion of the drum, which extensions are the same diameter as said central portion and cover the bead seat, and laying and splicing the edges of the fabric upon said extensions before shaping down over the shouldered portions of the drum.

3. The process of making drum built tires upon shouldered drums consisting in providing temporary extensions of the central flat drum surfaces in an axial direction over the shouldered portions thereof and flush with said surfaces, applying and splicing the fabric from edge to edge over the drum and the extensions, thereafter removing the extensions and shaping the spliced skirts of the fabric over the shouldered portions.

4. In an apparatus for building tires, the combination of shouldered drums having depressed bead seats, and rings movable toward and from the drum, said rings reaching at their innermost lateral margins to substantially the lines where the shoulders begin and constituting flush continuations of the central portions of the drums upon which the plies may be spliced from edge to edge before shaping about the shoulders and beads.

5. In an apparatus for building tires, the combination of a tire building drum having a substantially transversely flat central portion and shouldered edge portions containing bead seats, and extensions, said extensions reaching to the beginning of the shoulders and constituting continuations of the flat central portion upon which the edges of the fabric may be applied and spliced, said extensions being movable toward and away from the drum and covering said shouldered portions.

6. In an apparatus for building tires, the combination of a tire building drum having a substantially transversely flat central portion and shouldered edge portions containing bead seats, and extensions, said extensions reaching to the beginning of the shoulders and constituting continuations of the flat central portion upon which the edges of the fabric may be applied and spliced, said extensions being movable toward and away from the drum and covering said shouldered portions and clearing the beads after the same are in position.

7. The process of constructing drum built tires upon drums having shoulders of reduced diameter at their lateral margins which comprises temporarily axially elongating the central flat surface of the drum to accommodate the entire width of tire building fabric, the elongated surface being substantially of uniform diameter throughout, applying and splicing the said fabric from edge to edge upon said elongated drum surface, restoring said central drum surface to normal width, and then shaping the spliced marginal portions of the fabric to the shouldered portions of the drum.

FLORAIN J. SHOOK.